United States Patent

Krieter

[15] 3,638,683
[45] Feb. 1, 1972

[54] HYDRAULIC DIRECTIONAL CONTROL VALVES

[72] Inventor: Horst Krieter, Stollenweg, Germany
[73] Assignee: Westinghouse Bremsen- und Apparate-bau G.m.b.H., Hannover, Germany
[22] Filed: Mar. 30, 1970
[21] Appl. No.: 23,787

[30] Foreign Application Priority Data

May 29, 1969 Germany .......... P 19 27 465.8

[52] U.S. Cl. .................. 137/624.27, 137/625.69
[51] Int. Cl. .................................. F16k 11/07
[58] Field of Search .......... 137/624.27, 625.69, 102, 107; 251/94

[56] References Cited

UNITED STATES PATENTS

| 2,276,979 | 3/1942 | Jacobi | 137/624.27 |
| 2,689,585 | 9/1954 | Presnell | 137/624.27 |

*Primary Examiner*—Alan Cohan
*Attorney*—Ralph W. McIntire, Jr.

[57] ABSTRACT

This invention relates to a manually operable spool-type fluid pressure control valve that has a releasable locking mechanism to maintain the spool valve in certain of its positions until subjected to an axial force in excess of a chosen value. This locking mechanism comprises a plurality of balls and a pair of cam surfaces along which the balls roll when the spool valve is manually moved from one position to another. A fluid pressure force effective on one of the cam surfaces biases it against the balls to maintain them in either of two positions until the spool valve is subject to an external force in excess of the chosen value.

8 Claims, 4 Drawing Figures

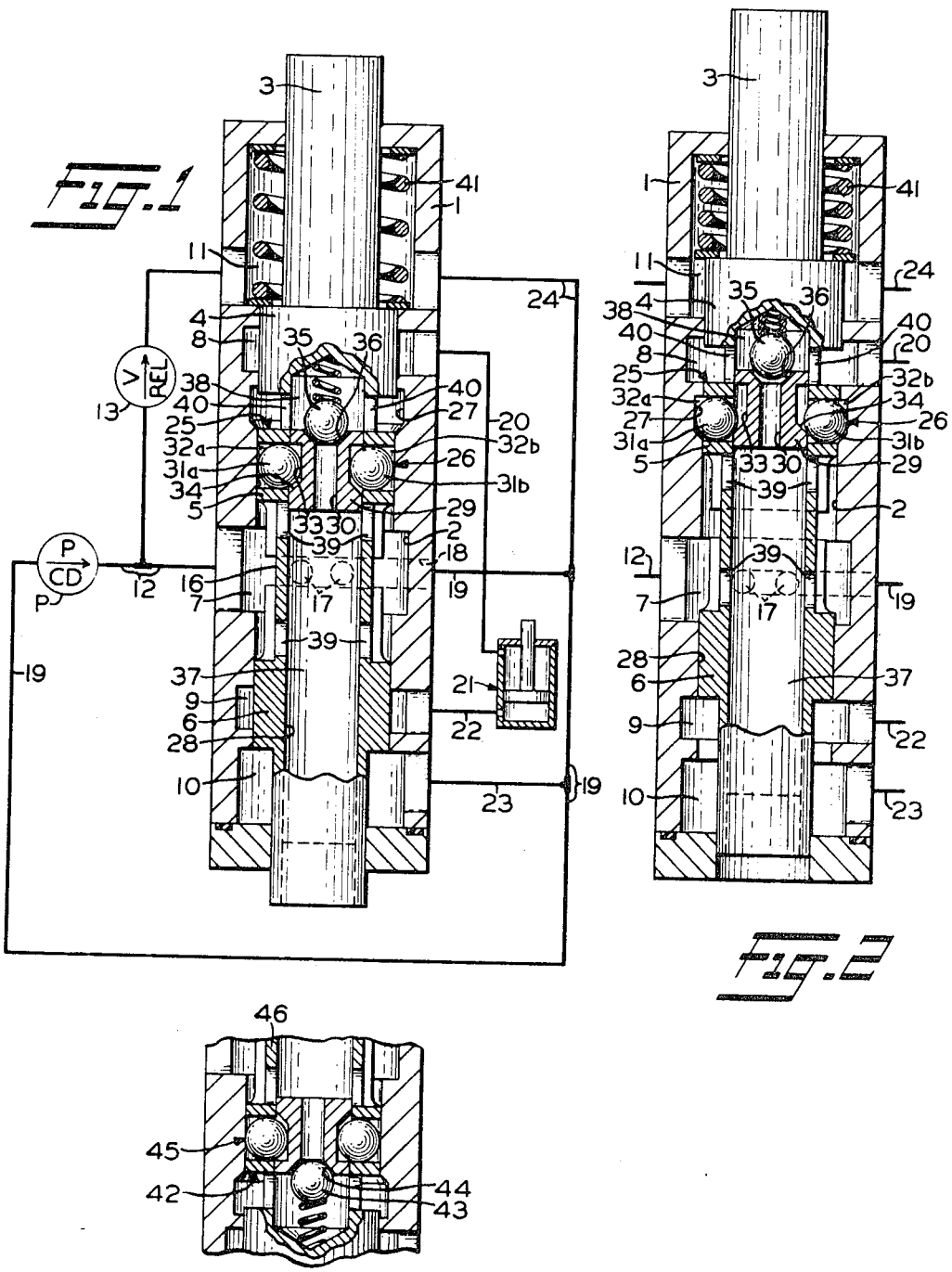

INVENTOR
HORST KRIETER

HYDRAULIC DIRECTIONAL CONTROL VALVES

The invention concerns a lock and release arrangement for control slide hydraulic path flow valves with one neutral and one or two control positions for the control of the double-acting cylinder which holds securely the control slide when it is pushed into a control position by the means of the action of the pressure differential operative engagement arrangement with the compressing of an opposing operative return spring and releases it by the means of the automatic elimination of the pressure differential whereby the control slide is moved back into its neutral position.

In one well-known lock and release arrangement the engagement arrangement consists of two engagement grooves arranged on the control slide and an engagement member with a piston that is arranged in a movable manner in the valve housing traverse to the slide axis and which is subjected to a pressure differential. As the means for developing this pressure differential there is provided a return check valve that is also arranged in the valve housing.

This well-known lock and release arrangement has the disadvantage that it requires a large volume inside of the valve housing whereby the latter is very space consuming. Additional disadvantages are the one-sided loading of the slide by the means of the engagement force that acts on it and the passages required in the valve housing for the assembling of the return check valve and the engagement member, the opening of which must be sealed from the outside against the high operating pressure. The equalization passages which are provided in the piston prevent the utilization of the so-called negative overlap, the explanation of which for the technician appears unnecessary.

The invention establishes as its basic purpose to eliminate these disadvantages. This appears in accordance with the invention thereby in that the mediums to develop the pressure differential as well as also thus the engagement medium that is subjected to this pressure differential are arranged in the control slide. In addition, it is established in accordance with the invention that the engagement mediums are movable due to the action of the pressure differential relative to the control slide in the lengthwise direction of the slide.

In a practical manner the engagement arrangement holds securely the control slide in the conventional manner with the engagement force which is dependent upon the pressure differential.

In additional design of the invention the medium for the development of the pressure differential is constructed as a return check valve. In addition, it is established that the engagement arrangement consists of an engagement sleeve that is arranged in the control slide coaxially with it and which due to the action of the pressure differential is axially movable relative to the control slide as well as also likewise the engagement balls arranged in the control slide, which by the means of the engagement sleeve are movable into the engagement groove. It is advantageous whenever the engagement sleeve varies the valve seat of the return check valve. With path flow valves with two control positions, the lock and release arrangement can be arranged dual and, indeed, in such a manner that each control position is arranged with a lock and release unit, whereby the lock and release units can exhibit either separated mediums for the developing of the pressure differential and separated engagement medium subjected to this pressure differential or separated mediums for the development of the pressure differential and common engagement medium subjected to the pressure differential.

In the following, three typical designs in accordance with the conditions of the invention are approximately described with reference to the drawing.

It is illustrated as follows:

FIG. 1 is a hydraulic path flow valve for a double-acting cylinder with two control positions and a lock and release arrangement in accordance with the conditions of the invention shown in the neutral position.

FIG. 2 is the path flow valve from FIG. 1 shown in the control position that is arranged for the lock and release arrangement.

Figure 4:
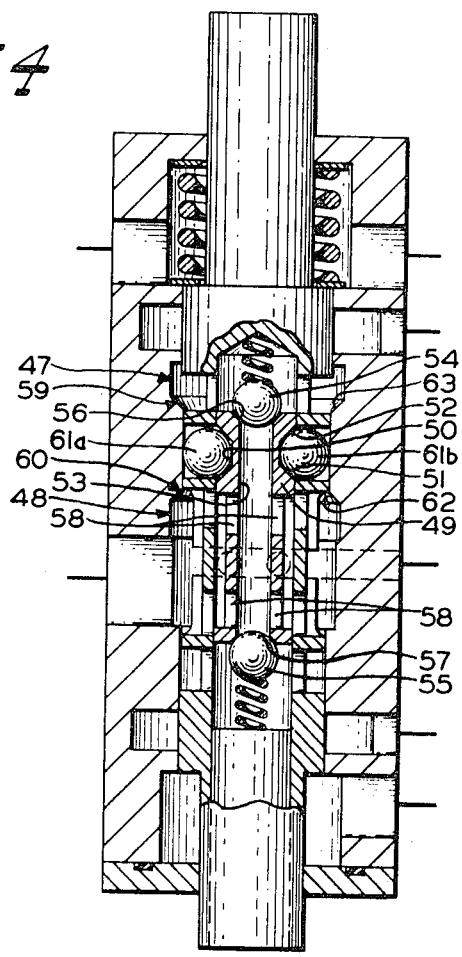

FIG. 3 is a partial view of another typical design form of the path flow valve in accordance with the FIGS. 1 and 2, with two control positions for each of which there is arranged a lock and a release unit arrangement in accordance with the conditions of the invention whereby both lock and release units exhibit separated mediums for the development of the pressure differential and separated engagement mediums which are subjected to this pressure differential, that is shown illustrated in the neutral position.

FIG. 4 is an additional typical design form of the path flow valve in accordance with the FIG. 3, with two control positions for each of which a lock and release unit is arranged in accordance with the conditions of the invention, whereby both lock and release units exhibit separated mediums for the development of the pressure differential and a common engagement medium that is subjected to the pressure differential, that is shown illustrated in the neutral position.

The path flow valve in accordance with the FIGS. 1 and 2 consists of the valve housing 1 with the housing passage 2 in which the control slide 3 is movable. Three control slides 4, 5 and 6 and five circular chambers 7, 8, 9, 10 and 11 work together with the displacing of the control slide 3 in the manner that is familiar to the technician. The circular chamber 7 is in connection by means of the piping 12 with the pump P which by the means of the pressure limiting valve 13 is established. By the means of the circular groove 16 on the control slide 3 as well as the passageways 17 and 18 and the piping 19, the circular chamber 7 is connectable with the pressureless return circuit or pump inlet.

The circular chamber 8 is connected by the means of the piping 20 with the one operating chamber of the double-acting cylinder 21, whose other operating chamber is connected by the means of the piping 22 with the circular chamber 9. The circular chambers 10 and 11 are in connection with the pressureless return circuit by the means of the pipings 23 and 24 respectively.

The lock and release arrangement 25 in accordance with the conditions of the invention exhibits the engagement arrangement 26 consisting of the engagement groove 27 that is arranged in the valve housing 1 coaxially to the housing passage 2, the engagement sleeve 29 with the lengthwise passageway 30 that is arranged in the lengthwise passageways 28 of the control slide 3 coaxial to it and movable axially relative to it, and equal sized stern areas as well as out of engagement balls 31a and 31b that are arranged in a movable manner in the radial passageways 32a and 32b that are equally divided in the control slide, and that can be displaced in a partial manner in the circular groove 33 of the engagement sleeve 29 with the ball shaped engagement surface 34. In the figure two engagement balls are visible. The engagement arrangement 26, however, can exhibit more than two as well as three or four engagement balls.

The lock and release arrangement 25 exhibits in addition thereto the return check valve 35, and seat 36 that serves as the medium for the development of the pressure differential that is arranged in the lengthwise passageway 28 in the control slide 3 and that is constructed by the means of the spring loaded valve ball 35 and the valve seat 36 that is carried by the engagement sleeve 29. The inner chamber of the control slide 3 that is formed by the means of the passage 28 is divided by the means of the return check valve 35 and seat 36 into two partial chambers 37 and 38. The partial chamber 37 is opened to the outside by the means of the ports 39 and the partial chamber 38 is opened to the outside by the means of the ports 40. By the means of the return spring 41, the control slide 3 is held in the neutral position as well as respectively returned to this position when no other forces overbalance.

The manner of operation is as follows: in the neutral position that is shown in the FIG. 1, the pump P is in connection with the pressureless circuit by the means of the circular chamber 7, the circular groove 16, the passages 17 and 18 and the piping 19. The piping 20 is closed off by the means of the control slide 4, the piping 22 through the control slide 6.

The closed return check valve 35, 36 separates the partial chambers 37 and 38 from each other. The engagement sleeve 29 that is pressed by the means of the spring-loaded valve ball 35 is held by the means of the engagement balls 31a and 31b that are partially pushed into the circular groove 33.

When the control slide is pulled into the first control position, that is shown in the FIG. 2, against the force of the return spring 41, then the connection between the pump P and the pressureless return circuit is interrupted by the means of the covering of the passageway 17 whereby the pressure $p1$ is built up in the partial chamber 37 that is connected with the circular chamber 7 by the means of the ports 39. The pressure medium unseats the return check valve 35 from its seat 36 whereby both partial chambers 37 and 38 are connected by means of the passage 30 and the pressure $p2$ is developed in the partial chamber 38 which is smaller than that pressure $p1$ that is in existence in the partial chamber 37 whereby the pressure differential $\Delta p = p1 - p2$ is dependent upon the spring force that activates on the valve ball 35. The engagement sleeve 29 is activated on the one stern surface with the pressure $p1$ and on the other stern surface with the pressure $p2$ wherefrom there is provided a force that moves the engagement sleeve relative to the control slide 3 in an upward direction on the drawing. The engagement sleeve 29 which serves as engagement medium under the pressure differential $\Delta p = p1 - p2$ forces the engagement balls 31a and 31b out from the circular groove 33 with the engagement surface 34 and pushed them into the engagement groove 27. The engagement arrangement 26 is so with engaged and the engagement balls 31a and 31b hold the control slide 3 in the control position securely with the engagement force that is greater than the opposing force of the return spring 41. The value of this engagement force is dependent upon the value of the pressure differential $\Delta p$ that activates on the engagement sleeve 29 and upon the force transfer that is developed by the means of the angle of the ball formed engagement area 34.

In the control position that is shown in the FIG. 2, the upper operating chamber of the cylinder 21 is pressure activated by the means of the circular chamber 7, the upper ports 39, the partial chamber 37, the passageway 30, the partial chamber 38 and ports 40, the circular chamber 8 and the piping 20, whereas the lower operating chamber is connected by the means of the piping 22, the circular chambers 9 and 10 and the piping 23 and 19 with the pressureless return circuit. The lock and release arrangement holds the control slide 3 securely in the illustrated control position so long as the flow from the partial chamber 37 to the partial chamber 38 is in existence. However, if this flow ceases because of desired or undesired conditions, then $\Delta p$ collapses and therewith the engagement force whereby the control slide 3 is released and is brought back into its neutral position by the means of the return spring 41. Hereby, the engagement balls 31a and 31b are moved out of engagement with the engagement groove 27 and are moved along with the control slide 3.

The control slide 3 can also assume a second control position in which it is pressed so far in a downward direction until the control slide 6 provides free opening for the connection between the pump P and the lower operating chamber of the cylinder 21 by the means of the circular chamber 7, the passage 2, the circular chamber 9 and the piping 22, whereas the circular slide 4 provides free opening for the connection between the upper operating chamber of the cylinder 21 and the pressureless return circuit by the means of the piping 20, the circular chambers 8 and 11 and the piping 24 and 19. In this unengagement control position thus the operating cylinder 21 is activated in the direction that is reversed in direction to the engaged control position. Since the partial chamber 38 is closed by the means of the control slides 4 and 5, the return check valve remains shut, whereby there is no flow between the partial chambers 37 and 38, and so with no $\Delta p$ is available, and as a consequence of lock and release arrangement is operative.

The typical design example that is in accordance with the FIG. 3 is different from the typical design example in accordance with the FIGS. 1 and 2 thus merely in that in as well as the first also the second control position is arranged with a lock and release position. In the FIG. 3, the lock and release arrangement unit 42 that is provided for the second control position is shown with the return check valve 43 and valve seat 44 that serves as the medium to develop a pressure differential and the engagement arrangement 45. Otherwise the path flow valve is inclusively identical to the lock and release unit that is arranged to the first control position as constructed in the FIGS. 1 and 2, and therefore not further explained. Also the lock and release unit 42 is identical to the lock and release unit constructed by 25.

The manner of operation of the path flow valve in accordance with the FIG. 3 is different from that of the path flow valves in accordance with the FIGS. 1 and 2 merely thereby in that the control slide 46 also is engaged in the second control position by the means of the lock and release unit 42 that is arranged to it. The manner of operation of the lock and release unit 42 is in conformity to that of the lock and release unit 25 in FIG. 1 and therefore is not explained any further.

The typical design example in accordance with the FIG. 4 is different from the typical design example in accordance with the FIG. 3 merely in that both the lock and release units exhibit common engagement mediums that are subject to the pressure differential.

For the only difference from the typical design example in accordance with FIG. 3 both the lock and release units 47 and 48 exhibit a common engagement sleeve 49 which has a circular groove 50 that exhibits engagement surfaces 51 and 52 that operate in the opposed position direction and whose lengthwise passage 53 is closed off at both ends by the means of the return flow check valve 54 and 55 and their respective seats 56 and 57 as in the neutral position of the FIG. 4. The inner chamber of the engagement sleeve is opened to the outside by the means of the ports 58. The engagement arrangements 59 and 60 exhibit common engagement balls 61a and 61b which are movable in accordance with the desired control position either from the engagement surface 52 into the engagement groove 62 or from the engagement surface 52 into the engagement groove 63. The springs that load the valve balls 54 as well as 55 respectively are measured so that they, with a relative displacement of the engagement sleeve 49 that is caused by the deformation of the spring, do not interfere with the function of the valve. The manner of operation of the path flow valve in accordance with the FIG. 4 is identical to that of the path flow valve in accordance with FIG. 3 and therefore is not explained any further.

It is familiar to the technician without anything additional that the lock and release arrangement in accordance with the conditions of the invention is also useable in flow path valves for simple operating cylinders. In an advantageous manner, it is also further possible that the return check valve 35, and seat 36 does not only develop the pressure differential required for the lock and release arrangement, but that it also makes it possible by the means of its return check function for the use of the negative overlap.

Additionally to the advantages that are obtained from the function that is not pressure, but instead is by the means of the through flow dependent function, the lock and release arrangement in accordance with the invention has the advantage in that for its accommodation in path flow valves, it is only necessary to require a very short measured additional length for the slides, however, no additional valve cross section is necessary. The halt and release arrangement has a very simple structure and can very easily be assembled. The control arrangement of the engagement sleeve 29 which the engagement balls 31a and 31b activate guarantees an equal application of the control slides by the means of the engagement forces which act upon them. In the described typical designs, the engagement members are constructed as balls. They can, however, also exhibit other practical forms for their function.

It is decernible from the figures that the outer lying positioned housing chambers 10 and 11 (FIG. 1) are connected, in each operating position of the control slide, with the pressureless return circuit. Thereby, the sealing of the stems of the control slide 3 that lead to the outside is simple and operationally positive.

The housings of the numerous path flow valves that are established with the lock and release arrangements in accordance with the invention conditions can be closed in together into a unit in the useable manner.

With the lock and release arrangement in accordance with the invention conditions, the engagement force can be held small in such a manner that the control slide 3 can be moved backward from each side by hand into the neutral position with the overcoming of the engagement force.

Having now described the invention, what I claim as new and desire to secure by Letters Patent, is:

1. In a releasably locked multiposition supply and release control valve device for controlling the operation of a fluid motor;
   a. valve means for controlling the supply of fluid under pressure to and the release of fluid under pressure from the fluid motor, said valve means comprising:
      i. a casing having a bore at the wall surface of which opens the longitudinally spaced-apart one end of a plurality of passageways extending through said casing to the exterior thereof,
      ii. a ported hollow spool-type valve slidably mounted in said bore and movable therein in opposite directions, and wherein the improvement comprises:
      iii. a one-way flow valve means movable mounted in said hollow spool-type valve and operable in cooperation with said spool-type valve to establish a first communication between one and another of said passageways upon movement of said spool-type valve from a first position, in which said spool-type valve solely establishes a second communication between said one passageway and a third one of said plurality of passageways, to a second position in which said communication between said one and said third passageways is closed and said communication between said one and another passageways is open, and
   b. means cooperable with said casing and said spool-type valve and operable, upon said spool-type valve establishing said communication between said one and another passageways, by the difference in the pressure in said one and another passageways to inhibit said one-way flow valve means from closing said communication.

2. In a releasably locked multiposition supply and release control valve device, as recited in claim 1, further characterized in that said one-way flow valve means comprises:
   a. a valve,
   b. a hollow cylindrical member provided with a valve seat at one end and with a peripheral annular groove having an inclined surface at the end thereof opposite the valve seat, said cylindrical member being movably mounted in said hollow spool-type valve, and
   c. biasing means normally biasing said valve into seating contact with said valve seat,
and said means cooperable with said casing and said spool-type valve comprises:
   a. a cam surface formed on the wall surface of said bore in said casing, and
   b. means interposed between said peripheral annular groove on said hollow cylindrical member and said cam surface,
   c. said cam surface and said inclined surface cooperating to provide for radial movement of said means in the direction away from said peripheral annular groove and in one direction along said cam surface by said inclined surface upon movement of said cylindrical member in the direction to establish said pressure differential, and radial movement in the direction toward said groove and in the opposite direction along said cam surface upon movement of said cylindrical member in an opposite direction in response to cessation of said pressure differential.

3. In a releasably locked multiposition supply and release control valve device, as recited in claim 2, further characterized in that said hollow spool-type valve is provided with a plurality of radially extending ports, and said means interposed between said peripheral annular groove and said cam surface comprises a plurality of balls disposed in said radially extending ports.

4. In a releasably locked multiposition supply and release control valve device, as recited in claim 1, further characterized in that said valve means also comprises:
   a. a second one-way flow valve means spaced-apart from said first one-way flow valve means and movably mounted in said hollow spool-type valve, said two one-way flow valve means being successively operable to establish respectively a first communication between said one and said another passageway and a second communication between said one and a fourth one of said plurality of passageways upon the respective successive movements of said spool-type valve in opposite directions from a first position in which said spool-type valve solely establishes a third communication between said one passageway and a fifth one of said plurality of passageways to a second position, and from said first position to a third position, in each of which second and third positions said third communication is closed.

5. In a releasably locked multiposition supply and release control valve device, as recited in claim 4 further characterized in that said second one-way flow valve means comprises:
   a. a valve,
   b. a hollow cylindrical member provided with a valve seat at one end and with a peripheral annular groove intermediate its ends, said groove having an annular inclined surface at the end thereof opposite said valve seat, and
   c. biasing means normally biasing said valve into seating contact with the corresponding valve seat,
   d. said pair of one-way flow means being slidably mounted in the respective opposite ends of said hollow spool-type valve.

6. In a releasably locked multiposition supply and release control valve device, as recited in claim 5, further characterized in that said means cooperable with said casing and said spool-type valve comprises:
   a. a pair of spaced-apart and oppositely arranged cam surfaces formed on the wall surface of said bore in said casing, and
   b. a plurality of spherical members interposed between said peripheral annular groove on each hollow cylindrical member and a corresponding one of said pair of cam surfaces,
   c. each of said cam surfaces and the inclined surface on a corresponding hollow cylindrical member cooperating to provide for radial movement of corresponding ones of said spherical members in the direction away from the peripheral annular groove on said corresponding hollow cylindrical member and in one direction along the corresponding cam surface by said inclined surface upon movement of said corresponding hollow cylindrical member in the direction responsive to the establishment of a corresponding pressure differential, and radial movement of said corresponding ones of said spherical members in the direction toward said peripheral annular groove on said corresponding hollow cylindrical member and in the opposite direction along said corresponding cam surface upon movement of said corresponding hollow cylindrical member in an opposite direction in response to the cessation of said corresponding pressure differential.

7. In a releasably locked multiposition supply and release control valve device, as recited in claim 4, further characterized in that said spool-type valve is ported, and said pair of spaced-apart one-way flow valve means comprises:
 a. a hollow cylindrical valve member slidably mounted within said hollow spool-type valve member for movement in opposite directions with respect to said hollow spool-type valve, said hollow cylindrical valve member having an annular valve seat at each end thereof, and being provided with a peripheral annular groove intermediate its ends, said groove having an annular inclined surface at each end thereof,
 b. a pair of valves, each cooperative with a corresponding one of said annular valve seats to control flow past the respective valve, and
 c. biasing means normally biasing each of said valves into seating contact with its corresponding valve seat, and said means cooperating with said casing and said spool-type valve comprises:
 a. a pair of spaced-apart oppositely arranged cam surfaces formed on the wall of said bore in said casing, and
 b. a plurality of movable members normally disposed in certain of said ports in said spool-type valve and normally interposed between said peripheral annular groove on said hollow cylindrical valve member and the wall of said bore in said casing extending between said pair of cam surfaces,
 c. said plurality of movable members being movable radially with respect to said spool-type valve and said cylindrical valve member in the direction away from said peripheral annular groove on said cylindrical valve member by one or the other of said inclined surfaces thereon and into abutting relationship with one or the other of said cam surfaces upon movement of said cylindrical valve member from a normal position in one direction or in an opposite direction with respect to said spool-type valve to establish one or another of said pressure differentials, and movable radially in the direction toward said peripheral annular groove on said hollow cylindrical valve member by one or the other of said cam surfaces upon return of said hollow cylindrical valve member to said normal position in response to cessation of said one or another of said pressure differentials.

8. In a releasably locked multiposition supply and release control valve device, as recited in claim 7, further characterized in that each of said pair of cam surfaces formed on the wall of said bore in said casing comprises a first internal cylindrical wall surface connected to a second coaxial internal cylindrical wall surface of larger diameter by an internal truncated conical wall surface.

* * * * *